(12) United States Patent
Chao et al.

(10) Patent No.: US 11,994,682 B2
(45) Date of Patent: May 28, 2024

(54) PROJECTION GLASSES, PROJECTION TEMPLE STRUCTURE, AND MODULARIZE OPTICAL ENGINE

(71) Applicant: MEGAFORCE COMPANY LIMITED, New Taipei (TW)

(72) Inventors: Cherng Chao, New Taipei (TW); Chih-Han Yen, New Taipei (TW); I-Ming Chou, New Taipei (TW)

(73) Assignee: MEGAFORCE COMPANY LIMITED, New Taipei (TW)

( * ) Notice: Subject to any disclaimer, the term of this patent is extended or adjusted under 35 U.S.C. 154(b) by 464 days.

(21) Appl. No.: 17/509,143

(22) Filed: Oct. 25, 2021

(65) Prior Publication Data

US 2022/0128818 A1  Apr. 28, 2022

Related U.S. Application Data (60) Provisional application No. 63/105,359, filed on Oct. 26, 2020.

(51) Int. Cl.
| | | |
|---|---|---|
| *G02B 27/01* | (2006.01) | |
| *G02B 6/06* | (2006.01) | |
| *G02B 26/08* | (2006.01) | |
| *G02B 30/40* | (2020.01) | |

(Continued)

(52) U.S. Cl.
CPC ........... *G02B 27/0172* (2013.01); *G02B 6/06* (2013.01); *G02B 26/0833* (2013.01); *G02B 30/40* (2020.01); *G03B 21/208* (2013.01); *H04N 9/3161* (2013.01); *G02B 2027/0178* (2013.01)

(58) Field of Classification Search
None
See application file for complete search history.

(56) References Cited

U.S. PATENT DOCUMENTS

| 7,068,444 B2 | 6/2006 | Nishi |
| 10,324,295 B2 | 6/2019 | Tatsuta et al. |

(Continued)

FOREIGN PATENT DOCUMENTS

| CN | 106405843 A | 2/2017 |
| CN | 107409189 A | 11/2017 |
| CN | 108732752 A | 11/2018 |

(Continued)

*Primary Examiner* — Bao-Luan Q Le
*Assistant Examiner* — Danell L Owens
(74) *Attorney, Agent, or Firm* — Li & Cai Intellectual Property (USA) Office (57) ABSTRACT

A pair of projection glasses, a projection temple structure, and a modularized optical engine are provided. The pair of projection glasses includes a frame and a projection temple structure that is detachably fastened to the frame. The projection temple structure includes a temple and a modularized optical engine that is embedded in the temple. The modularized optical engine includes a light emitting mechanism, a projection mechanism spaced apart from the light emitting mechanism, and a connection mechanism that optically and electrically connects the light emitting mechanism and the projection mechanism. The connection mechanism is configured to transmit light and image signal from the light emitting mechanism to the projection mechanism, so that the projection mechanism can project an image light.

20 Claims, 11 Drawing Sheets

(51) Int. Cl.
*G03B 21/20* (2006.01)
*H04N 9/31* (2006.01)

(56) References Cited

U.S. PATENT DOCUMENTS

2017/0010473 A1 1/2017 Ide
2020/0341282 A1* 10/2020 Mills ................ G02B 27/0176

FOREIGN PATENT DOCUMENTS

| | | |
|---|---|---|
| CN | 109143583 A | 1/2019 |
| CN | 109407326 A | 3/2019 |
| CN | 111025650 A | 4/2020 |
| JP | 6105293 B2 | 3/2017 |
| TW | M591174 U | 2/2020 |

\* cited by examiner

PROJECTION GLASSES, PROJECTION TEMPLE STRUCTURE, AND MODULARIZE OPTICAL ENGINE

CROSS-REFERENCE TO RELATED PATENT APPLICATION

This application claims priority to the U.S. Provisional Patent Application Ser. No. 63/105,359 filed on Oct. 26, 2020, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a pair of glasses, and more particularly to a pair of projection glasses, a projection temple structure, and a modularized optical engine of a pair of projection glasses.

BACKGROUND OF THE DISCLOSURE

A pair of conventional projection glasses (e.g., a pair of augmented reality glasses) includes a frame, two temples connected to the frame, and an optical engine. The optical engine is fixed to a corner co-defined by the frame and one of the two temples, so as to prevent detachment of the one of the two temples from the frame. Accordingly, it is not conducive to the independent production and maintenance of each component of the conventional projection glasses, thereby slowing down the speed at which the conventional projection glasses can be popularized to the public. In addition, the limitation of the position of the optical engine causes a front portion of the conventional projection glasses to be too bulky in size.

SUMMARY OF THE DISCLOSURE

In response to the above-referenced technical inadequacies, the present disclosure provides a pair of projection glasses, a projection temple structure, and a modularized optical engine of a pair of projection glasses to effectively improve on the issues associated with conventional projection glasses.

In one aspect, the present disclosure provides a pair of projection glasses, which includes a frame, two temples, and a modularized optical engine. The frame has a light input region arranged on one of two opposite ends thereof. The two temples are detachably assembled to the two opposite ends of the frame, respectively. Any one of the two temples includes a wearing segment arranged away from the frame, an assembling segment connected to the frame, and a connection segment that connects the assembling segment and the wearing segment. The modularized optical engine is embedded in one of the two temples to define a projection temple structure together with the one of the two temples. The modularized optical engine corresponds in position to the light input region of the frame, and the modularized optical engine includes a light emitting mechanism, a projection mechanism, and a connection mechanism. The light emitting mechanism is embedded in the wearing segment of the corresponding temple. The light emitting mechanism includes a light source unit configured to emit light and a control unit that is configured to emit an image signal. The projection mechanism is embedded in the assembling segment of the corresponding temple. Moreover, a light output portion of the projection mechanism faces toward the light input region. The connection mechanism has an optical fiber and an electrical wire that are embedded in the connection segment of the corresponding temple. Moreover, one end of the optical fiber is connected to the light source unit, another end of the optical fiber is connected to the projection mechanism, and the electrical wire electrically couples the control unit and the projection mechanism to each other. The connection mechanism is configured to transmit the light and the image signal from the light emitting mechanism to the projection mechanism through the optical fiber and the electrical wire, so that the projection mechanism is able to project an image light from the light output portion to the light input region.

In another aspect, the present disclosure provides a projection temple structure, which includes a temple and a modularized optical engine. The temple includes a wearing segment, an assembling segment, and a connection segment. The assembling segment is arranged away from the wearing segment and is configured to be detachably assembled to a frame. The connection segment connects the assembling segment and the wearing segment. The modularized optical engine includes a light emitting mechanism, a projection mechanism, and a connection mechanism. The light emitting mechanism is embedded in the wearing segment. The light emitting mechanism includes a light source unit configured to emit light and a control unit that is configured to emit an image signal. The projection mechanism is embedded in the assembling segment and has a light output portion. The connection mechanism has an optical fiber and an electrical wire that are embedded in the connection segment. Moreover, one end of the optical fiber is connected to the light source unit, another end of the optical fiber is connected to the projection mechanism, and the electrical wire electrically couples the control unit and the projection mechanism. The connection mechanism is configured to transmit the light and the image signal from the light emitting mechanism to the projection mechanism through the optical fiber and the electrical wire, so that the projection mechanism is able to project an image light from the light output portion.

In yet another aspect, the present disclosure provides a modularized optical engine of a pair of projection glasses, which includes a light emitting mechanism, a projection mechanism, and a connection mechanism. The light emitting mechanism includes a light source unit configured to emit light and a control unit that is configured to emit an image signal. The projection mechanism is spaced apart from the light emitting mechanism and has a light output portion. The connection mechanism has an optical fiber and an electrical wire. Moreover, one end of the optical fiber is connected to the light source unit, another end of the optical fiber is connected to the projection mechanism, and the electrical wire electrically couples the control unit and the projection mechanism to each other. The connection mechanism is configured to transmit the light and the image signal from the light emitting mechanism to the projection mechanism through the optical fiber and the electrical wire, so that the projection mechanism is able to project an image light from the light output portion.

Therefore, in any one of the pair of projection glasses, the projection temple structure, and the modularized optical engine of the present disclosure, the light emitting mechanism and the projection mechanism can be optically and electrically connected to each other through the optical fiber and the electrical wire, so that the modularized optical engine can be divided into multiple separate parts that are respectively embedded in different segments of the corresponding temple, thereby effectively managing the thickness of the projection temple structure.

Moreover, in the present disclosure, each of the two temples in the pair of projection glasses can be detached from the frame through the structural design of the modularized optical engine, thereby facilitating the independent production and maintenance of each component of the pair of projection glasses and effectively increasing the speed at which the pair of projection glasses can be popularized to the public.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
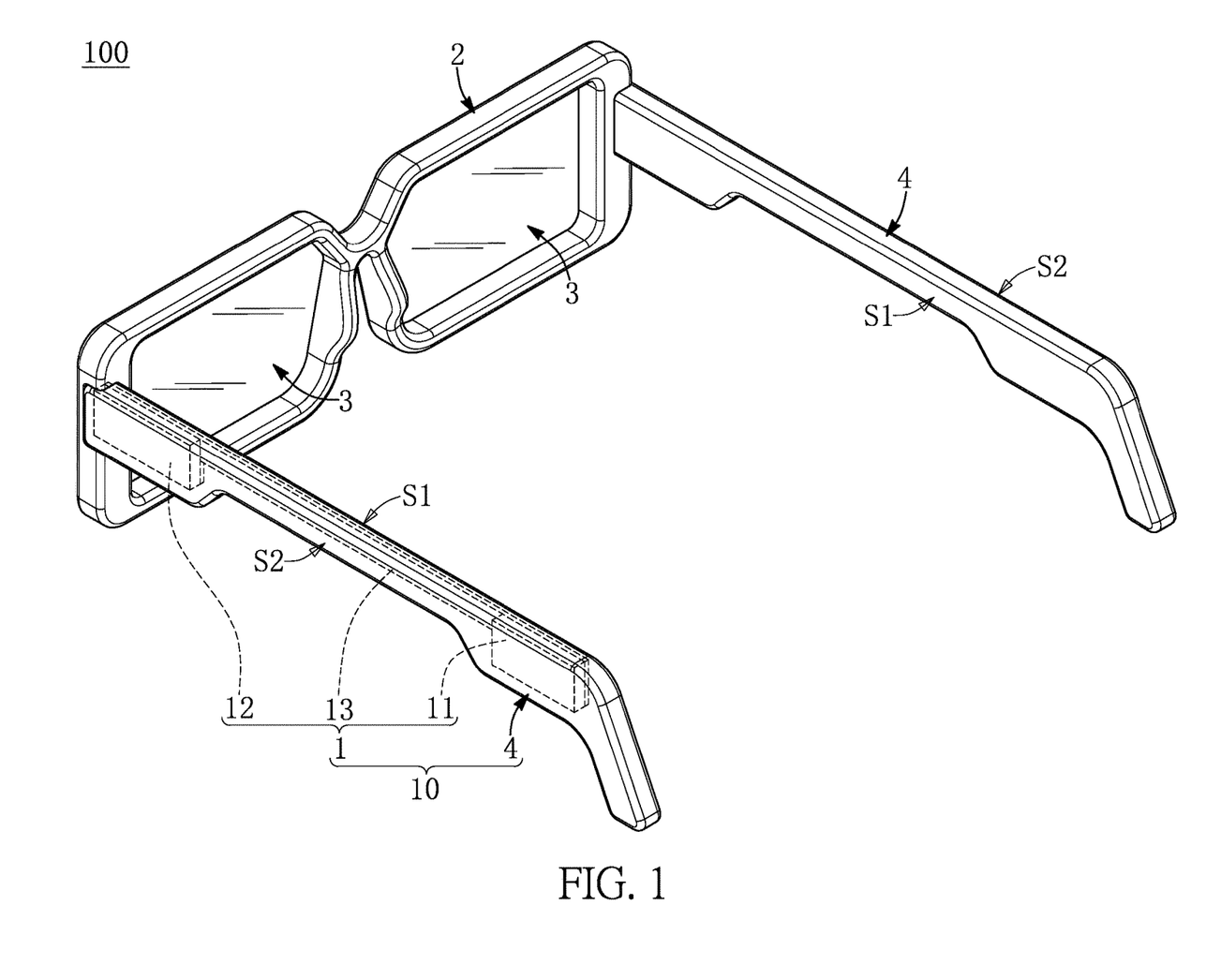
FIG. 1 is a perspective view of a pair of projection glasses according to a first embodiment of the present disclosure.
Figure 2:
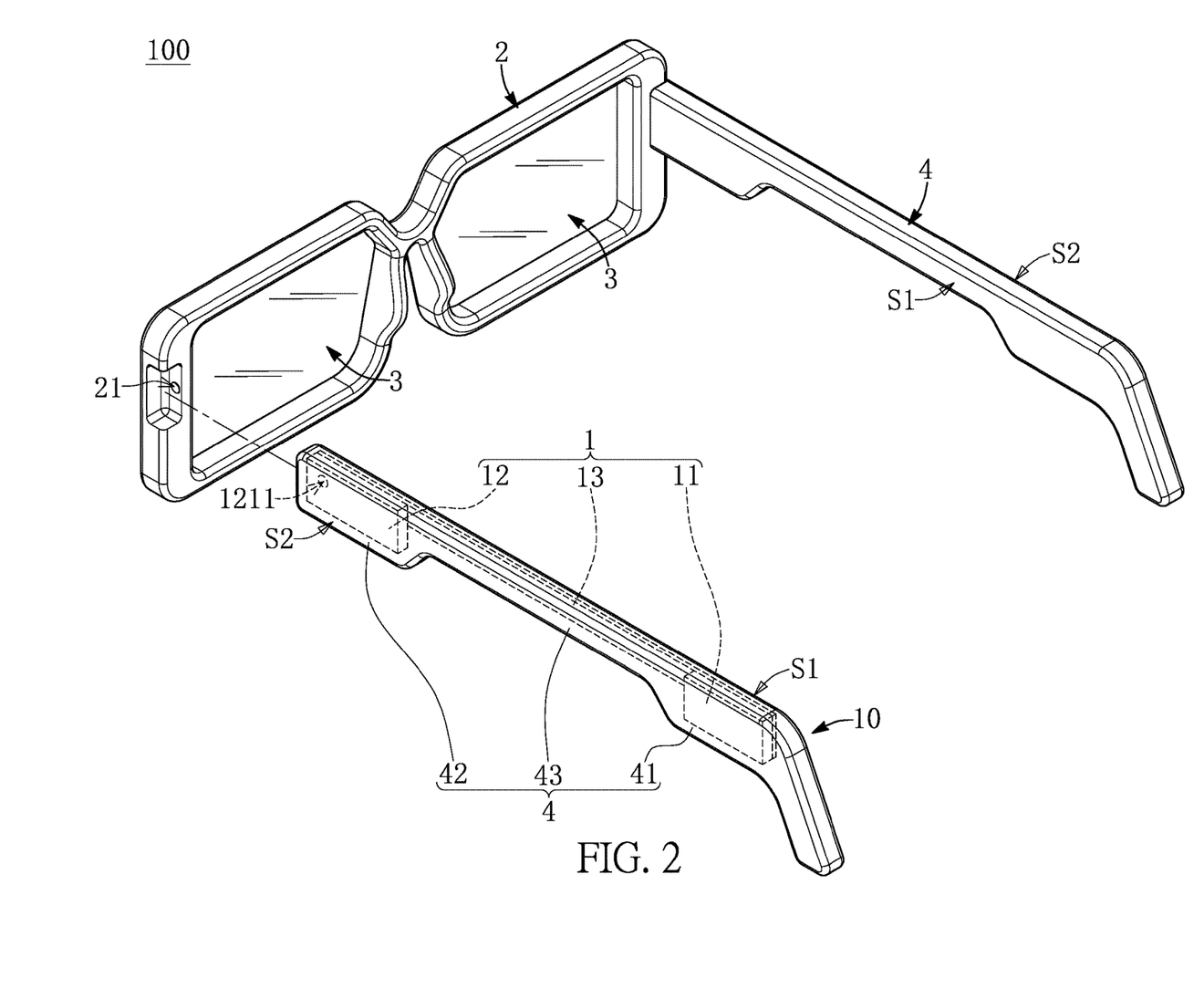
FIG. 2 is an exploded view of FIG. 1.

Reference is made to FIG. 1 to FIG. 5, which show a first embodiment of the present disclosure. As shown in FIG. 1 and FIG. 2, the present embodiment provides a pair of projection glasses 100 that can be a pair of augmented reality (AR) glasses, but the present disclosure is not limited thereto. The pair of projection glasses 100 in the present embodiment includes a frame 2, two lenses 3 fixed to the frame 2, two temples 4 respectively and detachably assembled to two opposite ends of the frame 2, and a modularized optical engine 1 that is embedded in one of the two temples 4.

It should be noted that the pair of projection glasses 100 in the present embodiment is described by including the above components, but the present disclosure is not limited thereto. For example, in other embodiments of the present disclosure not shown in the drawings, the two lenses 3 of the pair of projection glasses 100 can be connected to each other to be integrally formed as a one-piece structure; or, a quantity of the modularized optical engine 1 of the pair of projection glasses 100 is two, and each of the two temples 4 has one of the two modularized optical engines 1 embedded therein; or, the modularized optical engine 1 can be independently used (e.g., sold) or can be used in cooperation with other components.

Moreover, in the present embodiment, one of the two temples 4 and the modularized optical engine 1 embedded therein are jointly defined as a projection temple structure 10. In other words, any temple structure that cannot be detached from a frame is different from the projection temple structure 10 of the present embodiment. In addition, the projection temple structure 10 in the present embodiment is described in cooperation with the above components, but the present disclosure is not limited thereto. For example, in other embodiments of the present disclosure not shown in the drawings, the projection temple structure 10 can be independently used (e.g., sold) or can be used in cooperation with other components. The following description describes the structure and the connection relationship of each component of the pair of projection glasses 100.

The two opposite ends of the frame 2 are respectively arranged at two outer sides of the two lenses 3 away from each other, and one of the two opposite ends of the frame 2 has a light input region 21 (e.g., a thru-hole). In other words, the frame 2 allows light to enter into one of the two lenses 3 adjacent thereto through the light input region 21.

The two temples 4 in the present embodiment have a substantially same thickness, and each of the two temples 4 is an inherently one-piece structure. In other words, the two temples 4 exhibit substantial mirror symmetry with respect to the frame 2, but the present disclosure is not limited thereto. Each of the two temples 4 has a user side S1 and a heat-dissipation side S2 that are respectively arranged on two opposite sides thereof. The user sides S1 of the two temples 4 face toward each other. For example, when the pair of projection glasses 100 is worn by a user, one side of each of the two temples 4 adjacent to the user is defined as the user side S1, and the heat-dissipation side S2 of each of the two temples 4 is opposite to the user side S1, but the present disclosure is not limited thereto.

Figure 3:
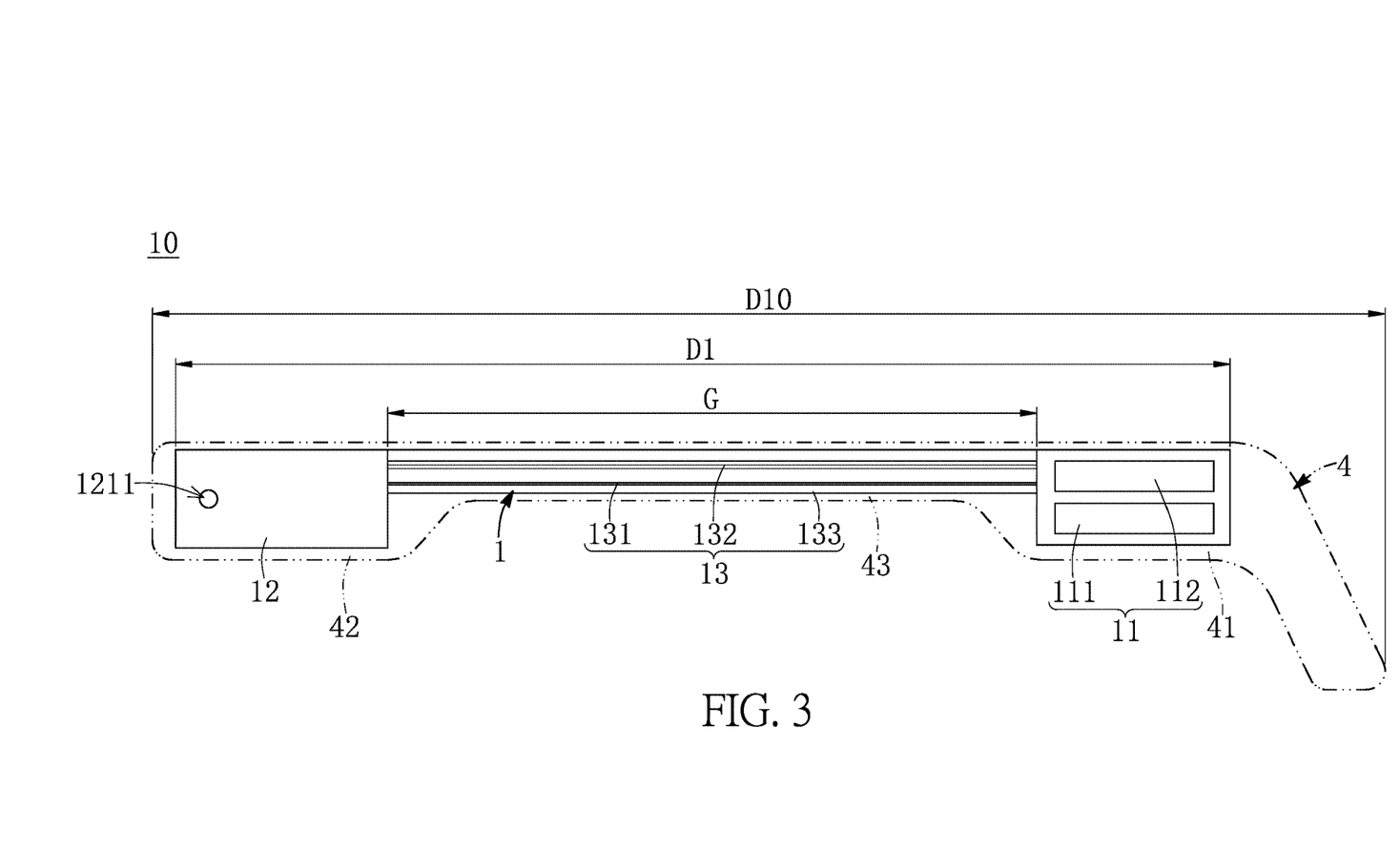
FIG. 3 is a schematic view of a projection temple structure according to the first embodiment of the present disclosure.

Specifically, each of the two temples 4 includes a wearing segment 41 arranged away from the frame 2, an assembling segment 42 connected to the frame 2, and a connection segment 43 that connects the assembling segment 42 and the wearing segment 41. The assembling segment 42 of each of the two temples 4 is configured to be detachably assembled to the frame 2. In other words, any pair of projection glasses that cannot detach temples therefrom has a configuration different from that of the pair of projection glasses 100 of the present embodiment.

Figure 4:
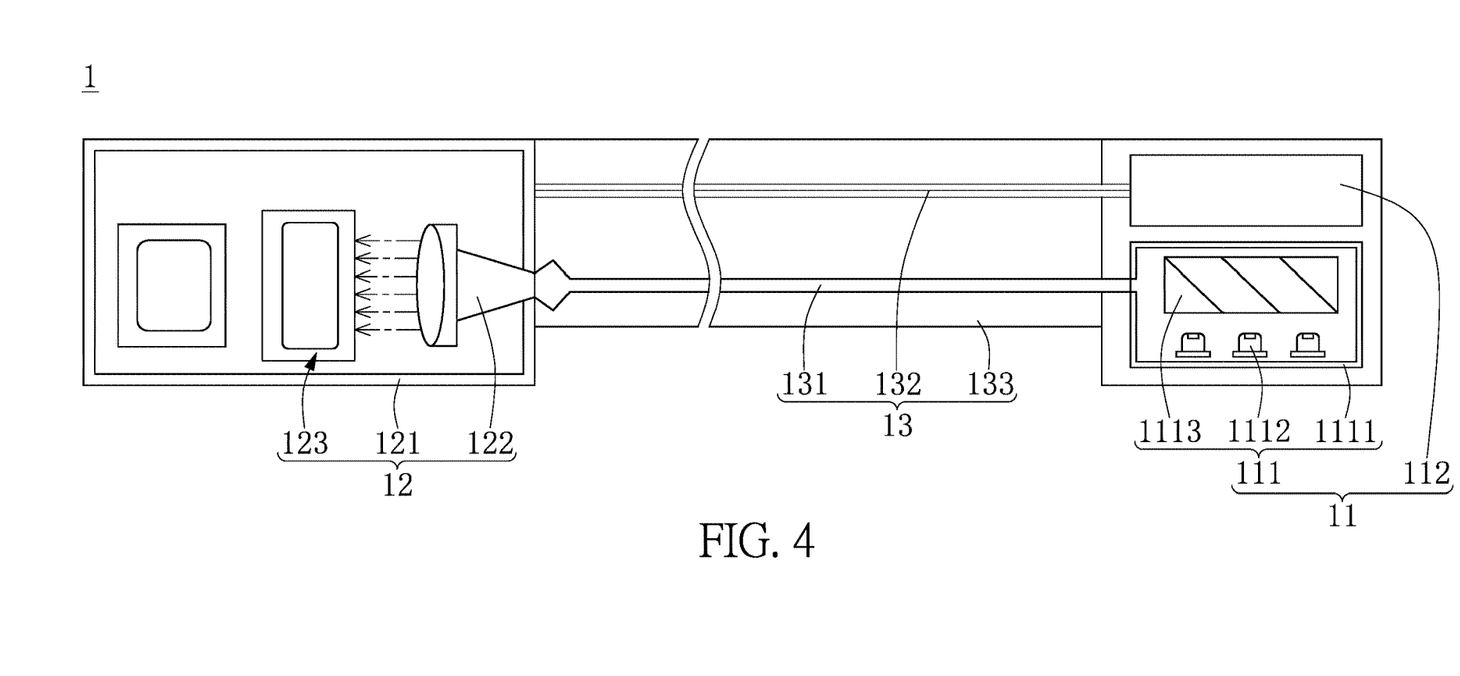
FIG. 4 is a schematic view of a modularized optical engine according to the first embodiment of the present disclosure.

As shown in FIG. 2 to FIG. 4, the modularized optical engine 1 (or the projection temple structure 10) corresponds in position to the light input region 21 of the frame 2, and the modularized optical engine 1 is arranged in the projection temple structure 10 by an arrangement distance D1 that is at least 80% of a length D10 of the projection temple structure 10.

In other words, the modularized optical engine 1 can be divided into multiple separated parts that are respectively embedded in different segments of the corresponding temple 4 (e.g., the wearing segment 41, the assembling segment 42, and the connection segment 43) through a structural design thereof, thereby effectively reducing the thickness of the corresponding temple 4.

Specifically, a thickness of the projection temple structure 10 can be substantially equal to the thickness of another one of the two temples 4, but the present disclosure is not limited thereto. It should be noted that the thickness of any one of the two temples 4 in the present embodiment can be defined by a distance between the user side S1 and the heat-dissipation side S2.

The modularized optical engine 1 includes a light emitting mechanism 11, a projection mechanism 12 spaced apart from the light emitting mechanism 11, and a connection mechanism 13 that optically and electrically connects the light emitting mechanism 11 and the projection mechanism 12. In other words, any optical engine that includes a light emitting mechanism and a projection mechanism that are directly connected to each other is different from the modularized optical engine 1 of the present embodiment.

The light emitting mechanism 11 is embedded in the wearing segment 41 of the corresponding temple 4. The light emitting mechanism 11 includes a light source unit 111 configured to emit light and a control unit 112 that is configured to emit an image signal. In the present embodiment, the light source unit 111 includes a housing 1111, a plurality of emitters 1112 (e.g., RGB laser diodes), and a light-combining lens 1113 that corresponds in position to the emitters 1112.

The emitters 1112 and the light-combining lens 1113 are disposed in the housing 1111, and the light-combining lens 1113 is configured to combine lights emitted from the emitters 1112 to be a beam of light passing through the housing 1111, but the present disclosure is not limited thereto. For example, in other embodiments of the present disclosure not shown in the drawings, a quantity of the emitters 1112 of the light source unit 111 can be only one (e.g., the emitter 1112 is a white light emitting diode or a white laser diode).

The projection mechanism 12 is embedded in the assembling segment 42 of the corresponding temple 4, and a light output portion 1211 of the projection mechanism 12 faces toward the light input region 21. The projection mechanism 12 and the light emitting mechanism 11 are spaced apart from each other by a distance G that is at least 25% of the length D10 of the projection temple structure 10.

Figure 5:
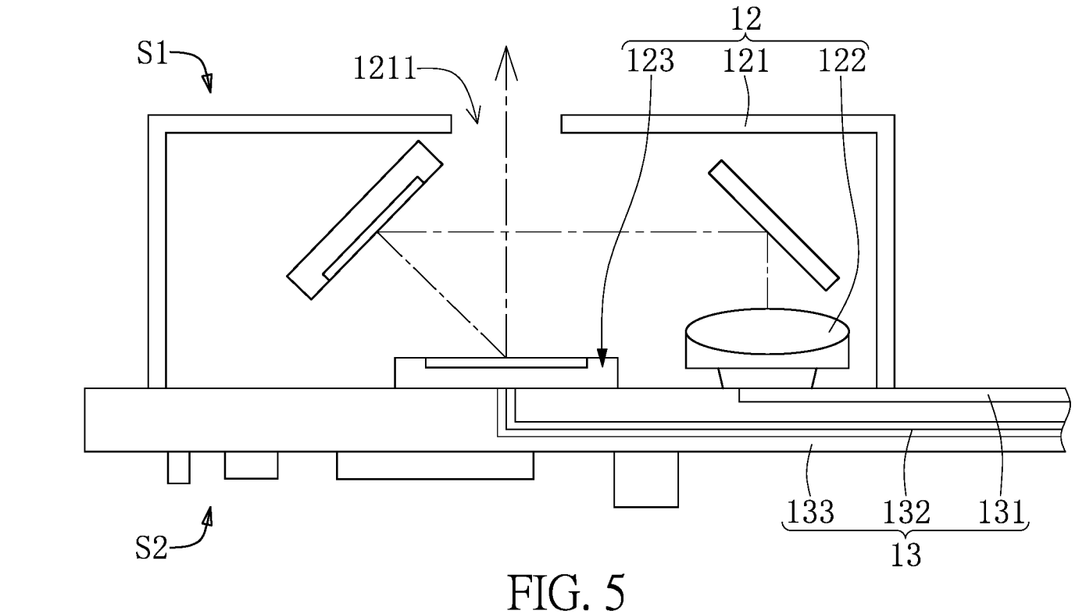
FIG. 5 is a partial side view of FIG. 4.

Moreover, the connection mechanism 13 includes an optical fiber 131, a plurality of electrical wires 132, and a transmission board 133 (as shown in FIG. 5) that is arranged adjacent to the heat-dissipation side S2 of the corresponding temple 4. The optical fiber 131 is embedded in the transmission board 133, and each of the electrical wires 132 is arranged on the transmission board 133. The transmission board 133 is embedded in the wearing segment 41, the connection segment 43, and the assembling segment 42 of the corresponding temple 4.

Specifically, the transmission board 133 in the present embodiment is a bendable and flexible structure and is exemplified by using a flexible printed board (FPC), but the present disclosure is not limited thereto. For example, in other embodiments of the present disclosure not shown in the drawings, the optical fiber 131 can be disposed on a surface of the transmission board 133; or, a quantity of the electrical wires 132 can be at least one; or, the transmission board 133 can be a rigid circuit board that cannot be bent; or, the transmission board 133 can be arranged on (or arranged adjacent to) the user side S1 of the corresponding temple 4.

In the present embodiment, the light emitting mechanism 11 and the projection mechanism 12 are respectively assembled onto two opposite portions of the transmission board 133 (e.g., portions of the transmission board 133 embedded in the wearing segment 41 and the assembling segment 42). Moreover, one end of the optical fiber 131 (e.g., a right end of the optical fiber 131 shown in FIG. 4) is connected to the light source unit 111, another end of the optical fiber 131 (e.g., a left end of the optical fiber 131 shown in FIG. 4) is connected to the projection mechanism 12, and at least one of the electrical wires 132 electrically couples the control unit 112 and the projection mechanism 12 to each other.

Specifically, as shown in FIG. 2, FIG. 4, and FIG. 5, the projection mechanism 12 includes a case 121, a collimator 122, and a micro-electromechanical systems (MEMS) module 123 that corresponds in position to the collimator 122. The collimator 122 and the MEMS module 123 are arranged in the case 121, and the collimator 122 is connected to the another end of the optical fiber 131. The MEMS module 123 is connected to the at least one of the electrical wires 132 so as to be electrically coupled to the control unit 112. Moreover, the light output portion 1211 of the projection mechanism 12 is arranged on the case 121 and corresponds in position to the MEMS module 123.

The connection mechanism 13 is configured to transmit the light and the image signal from the light emitting mechanism 11 to the projection mechanism 12 through the optical fiber 131 and the at least one of the electrical wires 132, so that the projection mechanism 12 is able to project an image light from the light output portion 1211 to the light input region 21 for displaying the image light in the corresponding lens 3.

In addition, since the transmission board 133 of the projection temple structure 10 in the present embodiment is bendable and flexible, the projection temple structure 10 can be bent at the connection segment 43 without affecting the transmission of the connection mechanism 13 relevant to the light and the image signal and without affecting projection of the image light from the light output portion 1211 of the projection mechanism 12 to the light input region 21.

Accordingly, in the pair of projection glasses 100, the projection temple structure 10, or the modularized optical engine 1 of the present embodiment, the light emitting mechanism 11 and the projection mechanism 12 can be optically and electrically connected to each other through the optical fiber 131 and the at least one of the electrical wires 132, so that the modularized optical engine 1 can be divided into multiple separated parts that are respectively embedded in different segments of the corresponding temple 4, thereby effectively controlling the thickness of the projection temple structure 10.

Moreover, each of the two temples 4 in the pair of projection glasses 100 can be detached from the frame 2 through the structural design of the modularized optical engine 1, thereby facilitating the independent production and maintenance of each component of the pair of projection glasses 100 and effectively increasing the speed at which the pair of projection glasses 100 can be popularized to the public.

Second Embodiment

Figure 6:
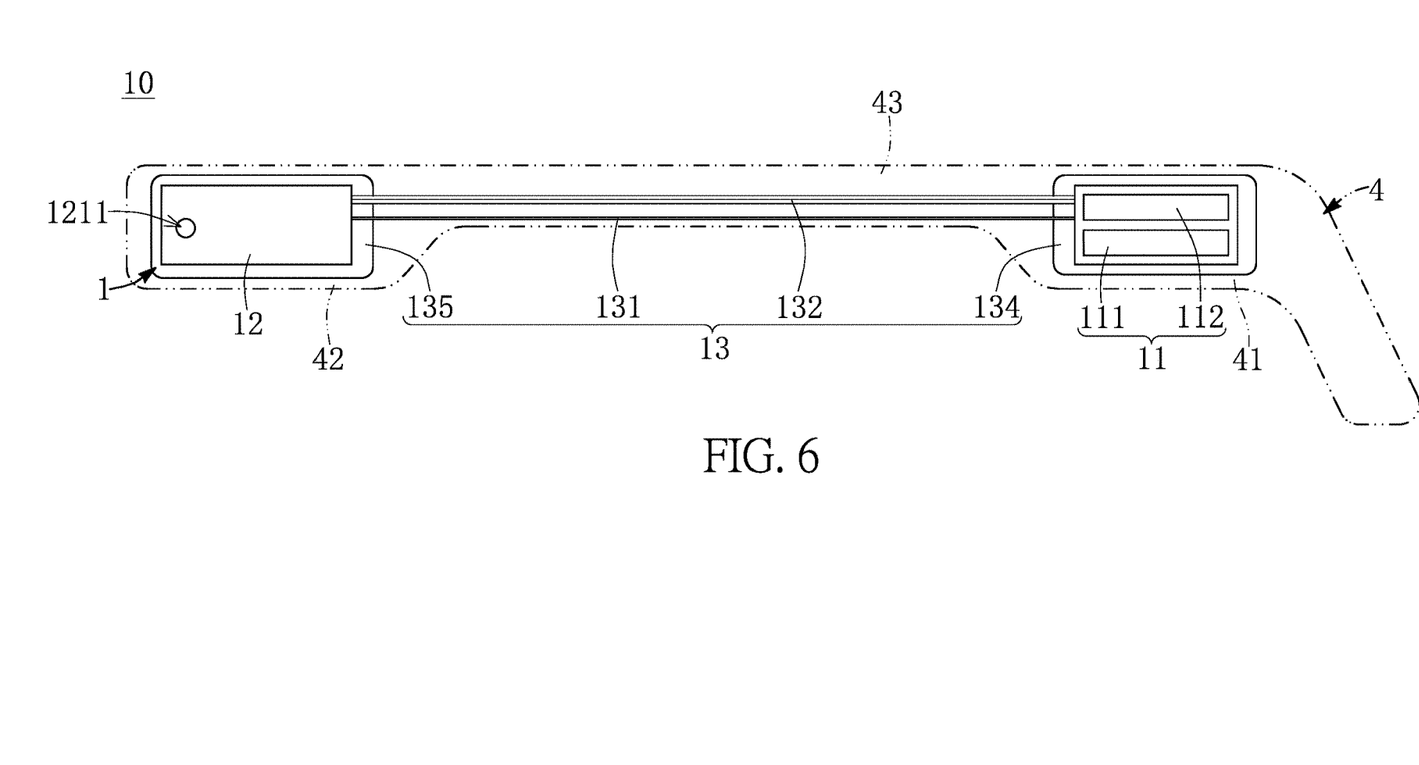
FIG. 6 is a schematic view of the projection temple structure according to a second embodiment of the present disclosure.

Referring to FIG. 6, a second embodiment of the present disclosure is provided, which is similar to the first embodiment of the present disclosure. For the sake of brevity, descriptions of the same components in the first and second embodiments of the present disclosure will be omitted herein, and the following description only discloses different features (e.g., the connection mechanism 13) between the first and second embodiments.

In the present embodiment, the connection mechanism 13 includes an optical fiber 131, a plurality of electrical wires 132, a first board 134 embedded in the wearing segment 41 of the corresponding temple 4, and a second board 135 embedded in the assembling segment 42 of the corresponding temple 4.

The light emitting mechanism 11 is assembled onto the first board 134, and the projection mechanism 12 is assembled onto the second board 135. Two ends of any one of the electrical wires 132 are respectively connected to the first board 134 and the second board 135 so as to electrically couple the control unit 112 and the projection mechanism 12 to each other. In other words, the first board 134 and the second board 135 of the connection mechanism 13 in the present embodiment are provided to replace the transmission board 133 of the first embodiment.

Third Embodiment

Figure 7:
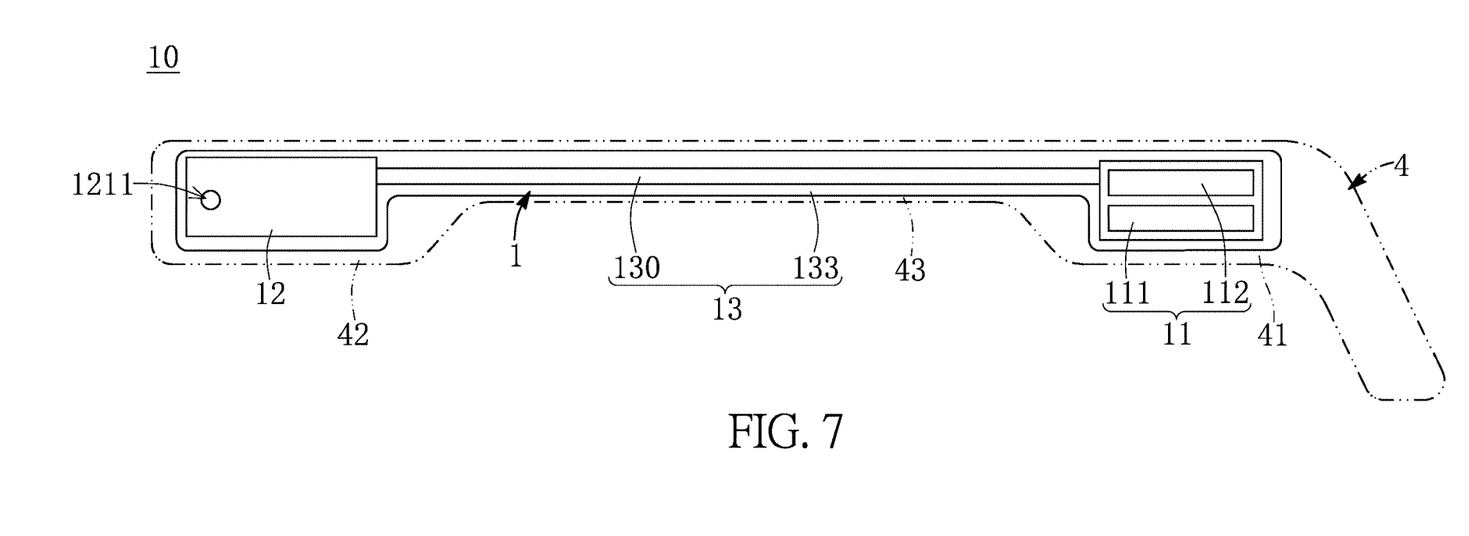
FIG. 7 is a schematic view of the projection temple structure in a first configuration according to a third embodiment of the present disclosure.
Figure 8:
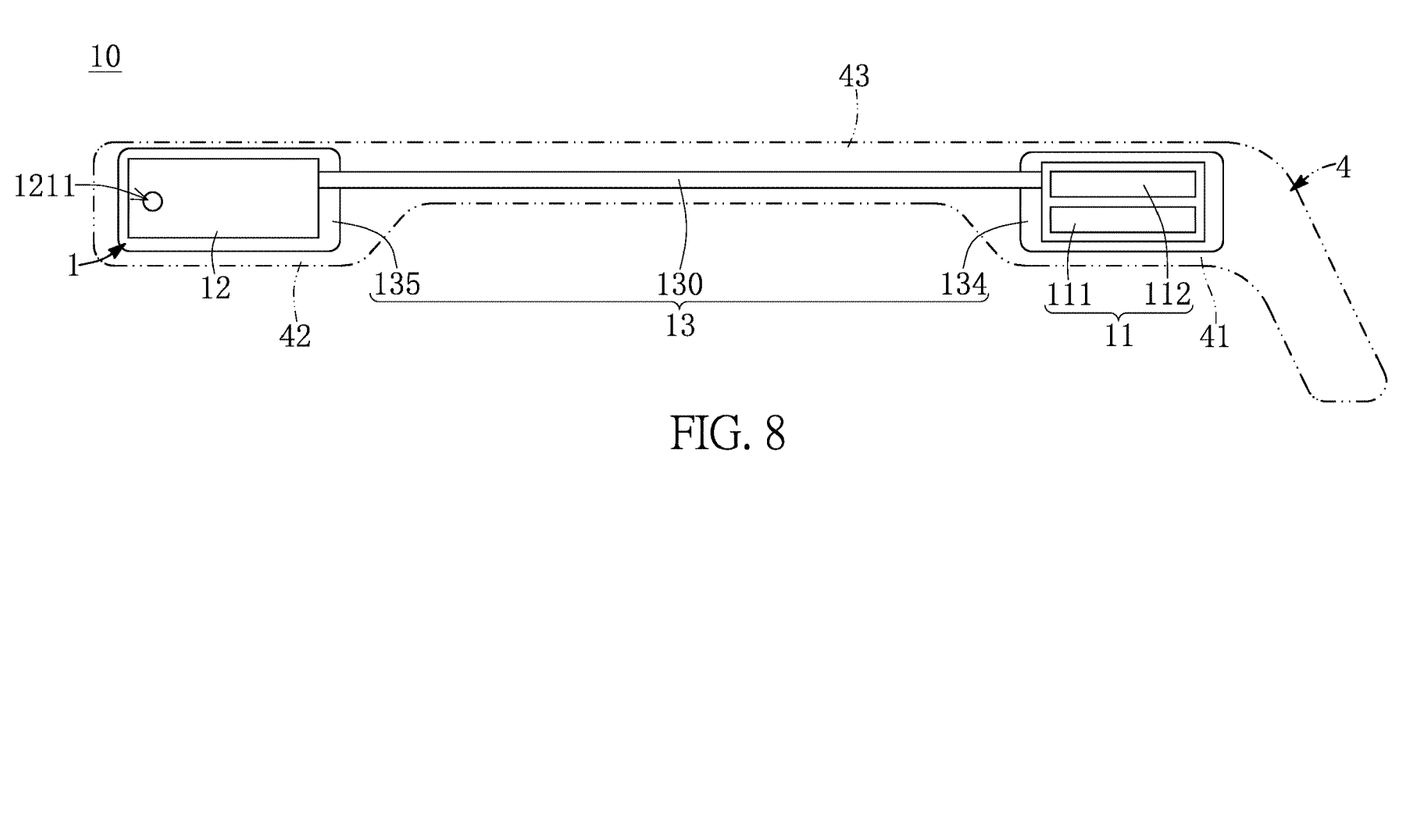
FIG. 8 is a schematic view of the projection temple structure in a second configuration according to the third embodiment of the present disclosure.
Figure 9:
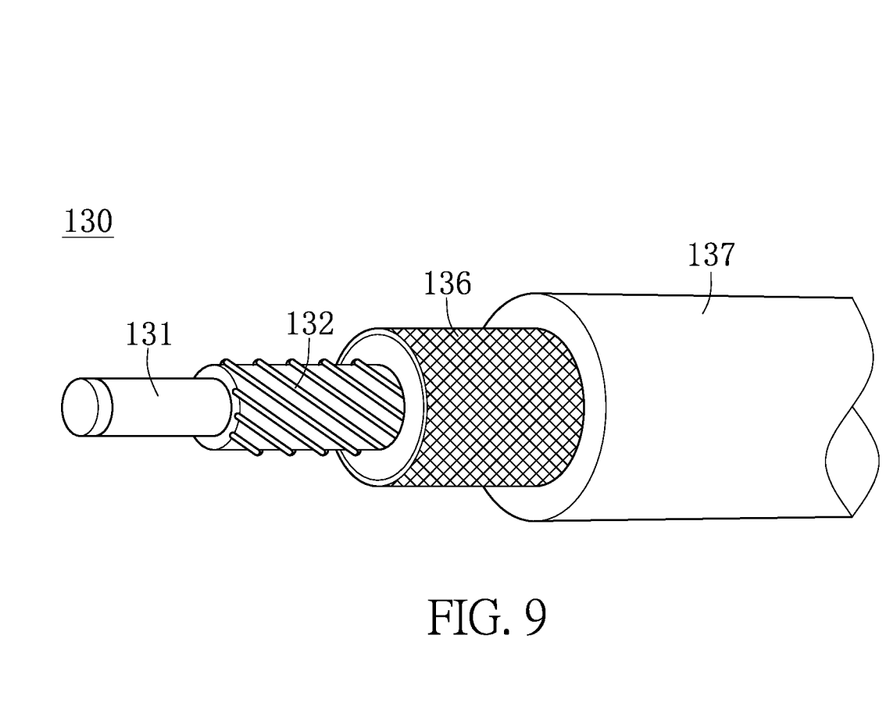
FIG. 9 is a partial perspective view of an optoelectronic hybrid cable of FIG. 7 and FIG. 8.

Referring to FIG. 7 to FIG. 9, a third embodiment of the present disclosure is provided, which is similar to the first and second embodiments of the present disclosure. For the sake of brevity, descriptions of the same components in the first to third embodiments of the present disclosure will be omitted herein, and the following description only discloses different features (e.g., the connection mechanism 13) among the first to third embodiments.

In the present embodiment, the electrical wires 132 surround an outside of the optical fiber 131. Moreover, the connection mechanism 13 includes a metal shielding layer 136 that covers the electrical wires 132 and an insulating layer 137 that covers the metal shielding layer 136. In other words, the optical fiber 131, the electrical wires 132, the metal shielding layer 136, and the insulating layer 137 jointly form an optoelectronic hybrid cable 130 that is preferably a bendable and flexible structure, but the present disclosure is not limited thereto.

Specifically, as shown in FIG. 7, the connection mechanism 13 in the present embodiment can adopt the transmission board 133 as disclosed in the first embodiment, and the optoelectronic hybrid cable 130 can be embedded in the transmission board 133. Or, as shown in FIG. 8, the connection mechanism 13 in the present embodiment can adopt the first board 134 and the second board 135 as disclosed in the second embodiment, and the optoelectronic hybrid cable 130 can be directly embedded in the corresponding temple 4.

Fourth Embodiment

Figure 10:
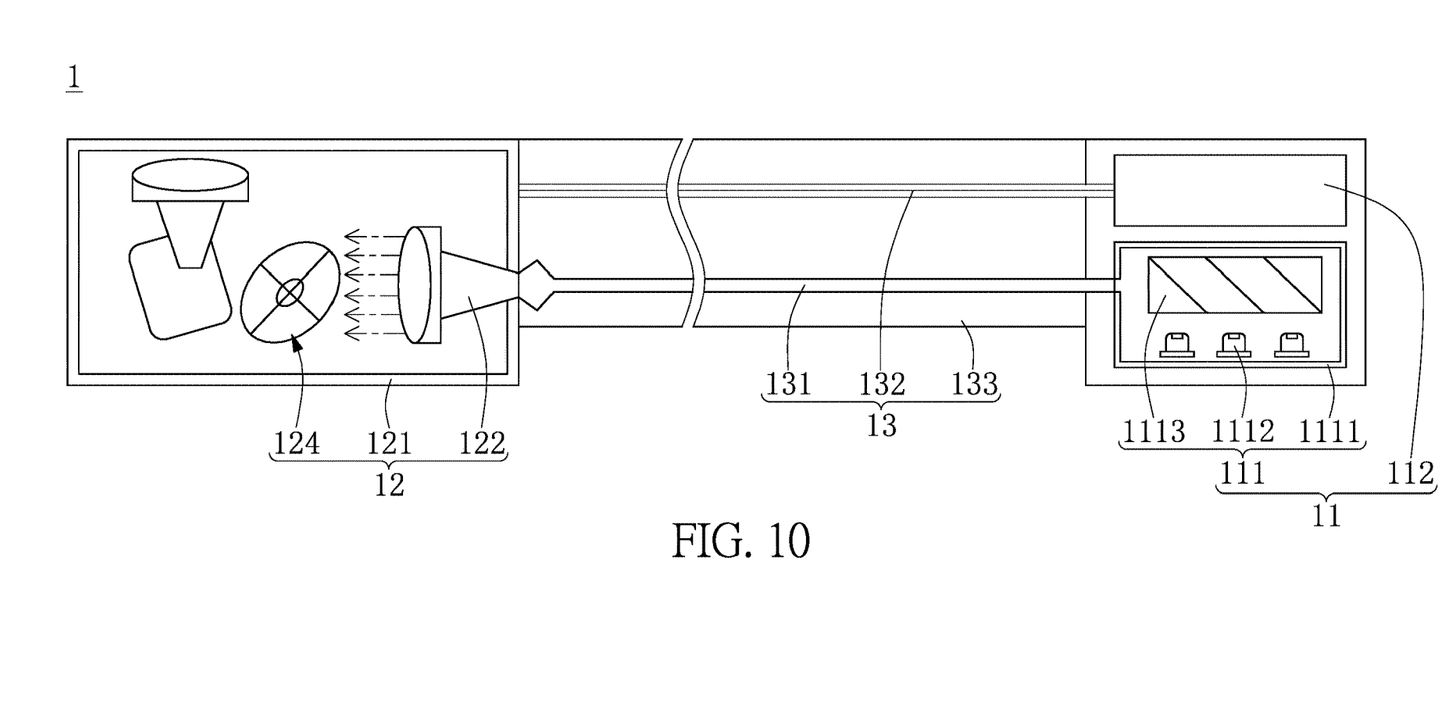
FIG. 10 is a schematic view of the modularized optical engine according to a fourth embodiment of the present disclosure.
Figure 11:
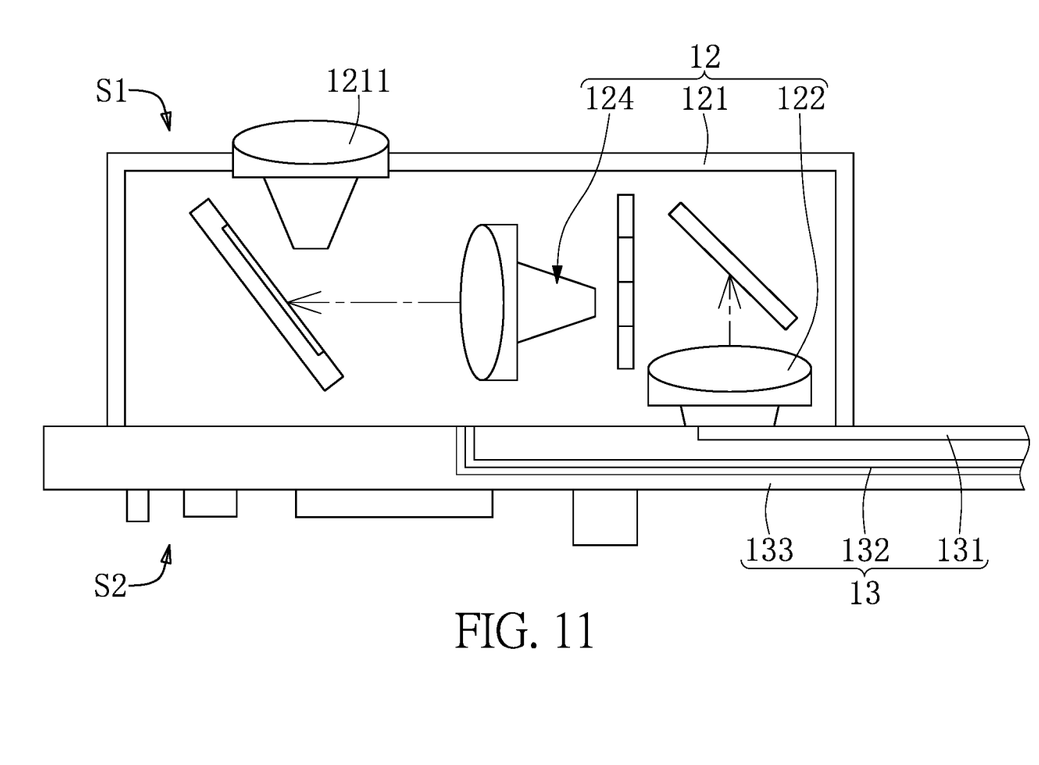
FIG. 11 is a partial side view of FIG. 10.

Referring to FIG. 10 FIG. 11, a fourth embodiment of the present disclosure is provided, which is similar to the first embodiment of the present disclosure. For the sake of brevity, descriptions of the same components in the first and fourth embodiments of the present disclosure will be omitted herein, and the following description only discloses different features (e.g., the projection mechanism 12) between the first and fourth embodiments.

In the present embodiment, the projection mechanism 12 includes a case 121, a collimator 122, and a digital light processing (DLP) module 124 that corresponds in position to the collimator 122. The collimator 122 and the DLP module 124 are arranged in the case 121, and the collimator 122 is connected to the another end of the optical fiber 131. The DLP module 124 is connected to the at least one of the electrical wires 132 so as to be electrically coupled to the control unit 112. Moreover, the light output portion 1211 of the projection mechanism 12 is arranged on the case 121 and corresponds in position to the DLP module 124.

Beneficial Effects of the Embodiments

In conclusion, in any one of the pair of projection glasses, the projection temple structure, and the modularized optical engine of the present disclosure, the light emitting mechanism and the projection mechanism can be optically and electrically connected to each other through the optical fiber and at least one of the electrical wires, so that the modularized optical engine can be divided into multiple separated parts that are respectively embedded in different segments of the corresponding temple, thereby effectively controlling the thickness of the projection temple structure.

Moreover, in the present disclosure, each of the two temples in the pair of projection glasses can be detached from the frame through the structural design of the modularized optical engine, thereby facilitating the independent production and maintenance of each component of the pair of projection glasses and effectively increasing the speed at which the pair of projection glasses can be popularized to the public.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pair of projection glasses, comprising:
   a frame having a light input region arranged on one of two opposite ends thereof;
   two temples detachably assembled to the two opposite ends of the frame, respectively, wherein any one of the two temples includes a wearing segment arranged away from the frame, an assembling segment connected to the frame, and a connection segment that connects the assembling segment and the wearing segment; and
   a modularized optical engine embedded in one of the two temples to define a projection temple structure together with the one of the two temples, wherein the modularized optical engine corresponds in position to the light input region of the frame, and the modularized optical engine includes:
      a light emitting mechanism embedded in the wearing segment of the corresponding temple, wherein the light emitting mechanism includes a light source unit configured to emit light and a control unit configured to emit an image signal;
      a projection mechanism embedded in the assembling segment of the corresponding temple, wherein a light output portion of the projection mechanism faces toward the light input region; and
      a connection mechanism having an optical fiber and an electrical wire that are embedded in the connection segment of the corresponding temple, wherein one end of the optical fiber is connected to the light source unit, another end of the optical fiber is connected to the projection mechanism, and the electrical wire electrically couples the control unit and the projection mechanism to each other;
   wherein the connection mechanism is configured to transmit the light and the image signal from the light emitting mechanism to the projection mechanism through the optical fiber and the electrical wire, respectively, so that the projection mechanism is able to project an image light from the light output portion to the light input region.

2. The projection glasses according to claim 1, wherein the projection mechanism and the light emitting mechanism are spaced apart from each other by a distance that is at least 25% of a length of the projection temple structure.

3. The projection glasses according to claim 1, wherein the modularized optical engine is arranged in the projection temple structure by an arrangement distance that is at least 80% of a length of the projection temple structure.

4. The projection glasses according to claim 1, wherein the connection mechanism includes:
   a first board embedded in the wearing segment of the corresponding temple, wherein the light emitting mechanism is assembled onto the first board; and
   a second board embedded in the assembling segment of the corresponding temple, wherein the projection mechanism is assembled onto the second board, and two ends of the electrical wire are respectively connected to the first board and the second board so as to electrically couple the control unit and the projection mechanism to each other.

5. The projection glasses according to claim 1, wherein the connection mechanism includes a transmission board that is embedded in the wearing segment, the connection segment, and the assembling segment of the corresponding temple, and wherein the light emitting mechanism and the projection mechanism are respectively assembled onto two opposite portions of the transmission board, the optical fiber is embedded in the transmission board, and the electrical wire is arranged on the transmission board.

6. The projection glasses according to claim 5, wherein each of the two temples has a user side and a heat-dissipation side that are arranged on two opposite sides thereof, and wherein the user sides of the two temples face toward each other, and the transmission board is located adjacent to the heat-dissipation side of the corresponding temple.

7. The projection glasses according to claim 1, wherein a quantity of the electrical wire is more than one, and the electrical wires surround an outside of the optical fiber, wherein the connection mechanism includes a metal shielding layer covering the electrical wires and an insulating layer that covers the metal shielding layer, and wherein the optical fiber, the electrical wires, the metal shielding layer, and the insulating layer jointly form an optoelectronic hybrid cable.

8. The projection glasses according to claim 1, wherein the projection temple structure is bendable at the connection segment without affecting projection of the image light from the light output portion of the projection mechanism to the light input region.

9. The projection glasses according to claim 1, wherein the projection mechanism includes:
   a collimator connected to the another end of the optical fiber; and
   a micro-electromechanical systems (MEMS) module corresponding in position to the collimator, wherein the MEMS module is electrically coupled to the control unit through the electrical wire, and the light output portion corresponds in position to the MEMS module.

10. The projection glasses according to claim 1, wherein the projection mechanism includes:
    a collimator connected to the another end of the optical fiber; and
    a digital light processing (DLP) module corresponding in position to the collimator, wherein the DLP module is electrically coupled to the control unit through the electrical wire, and the light output portion corresponds in position to the DLP module.

11. A projection temple structure, comprising:
    a temple including:
       a wearing segment;
       an assembling segment arranged away from the wearing segment and configured to be detachably assembled to a frame, and
       a connection segment that connects the assembling segment and the wearing segment; and
    a modularized optical engine including:
       a light emitting mechanism embedded in the wearing segment, wherein the light emitting mechanism includes a light source unit configured to emit light and a control unit that is configured to emit an image signal;

a projection mechanism embedded in the assembling segment and having a light output portion; and a connection mechanism having an optical fiber and an electrical wire that are embedded in the connection segment, wherein one end of the optical fiber is connected to the light source unit, another end of the optical fiber is connected to the projection mechanism, and the electrical wire electrically couples the control unit and the projection mechanism to each other;

wherein the connection mechanism is configured to transmit the light and the image signal from the light emitting mechanism to the projection mechanism through the optical fiber and the electrical wire, respectively, so that the projection mechanism is able to project an image light from the light output portion.

12. The projection temple structure according to claim 11, wherein the projection mechanism and the light emitting mechanism are spaced apart from each other by a distance that is at least 25% of a length of the projection temple structure.

13. The projection temple structure according to claim 11, wherein the modularized optical engine is arranged in the projection temple structure by an arrangement distance that is at least 80% of a length of the projection temple structure.

14. The projection temple structure according to claim 11, wherein the projection temple structure is bendable at the connection segment without affecting projection of the image light from the light output portion of the projection mechanism.

15. A modularized optical engine, comprising:
a light emitting mechanism including a light source unit configured to emit light and a control unit that is configured to emit an image signal;
a projection mechanism spaced apart from the light emitting mechanism and having a light output portion; and
a connection mechanism having an optical fiber and an electrical wire, wherein one end of the optical fiber is connected to the light source unit, another end of the optical fiber is connected to the projection mechanism, and the electrical wire electrically couples the control unit and the projection mechanism to each other;
wherein the connection mechanism is configured to transmit the light and the image signal from the light emitting mechanism to the projection mechanism through the optical fiber and the electrical wire, respectively, so that the projection mechanism is able to project an image light from the light output portion.

16. The modularized optical engine according to claim 15, wherein the connection mechanism includes:
a first board, wherein the light emitting mechanism is assembled onto the first board; and
a second board, wherein the projection mechanism is assembled onto the second board, and two ends of the electrical wire are respectively connected to the first board and the second board so as to electrically couple the control unit and the projection mechanism to each other.

17. The modularized optical engine according to claim 15, wherein the connection mechanism includes a transmission board, and wherein the light emitting mechanism and the projection mechanism are respectively assembled onto two opposite portions of the transmission board, the optical fiber is embedded in the transmission board, and the electrical wire is arranged on the transmission board.

18. The modularized optical engine according to claim 15, wherein a quantity of the electrical wire is more than one, and the electrical wires surround an outside of the optical fiber, wherein the connection mechanism includes a metal shielding layer covering the electrical wires and an insulating layer that covers the metal shielding layer, and wherein the optical fiber, the electrical wires, the metal shielding layer, and the insulating layer jointly form an optoelectronic hybrid cable.

19. The modularized optical engine according to claim 15, wherein the projection mechanism includes:
a collimator connected to the another end of the optical fiber; and
a micro-electromechanical systems (MEMS) module corresponding in position to the collimator, wherein the MEMS module is electrically coupled to the control unit through the electrical wire, and the light output portion corresponds in position to the MEMS module.

20. The modularized optical engine according to claim 15, wherein the projection mechanism includes:
a collimator connected to the another end of the optical fiber; and
a digital light processing (DLP) module corresponding in position to the collimator, wherein the DLP module is electrically coupled to the control unit through the electrical wire, and the light output portion corresponds in position to the DLP module.

* * * * *